Jan. 1, 1957 R. L. YOUNG 2,775,993
ADJUSTABLE ANTI-SKID DEVICE FOR PNEUMATIC TIRE
Filed Oct. 12, 1954
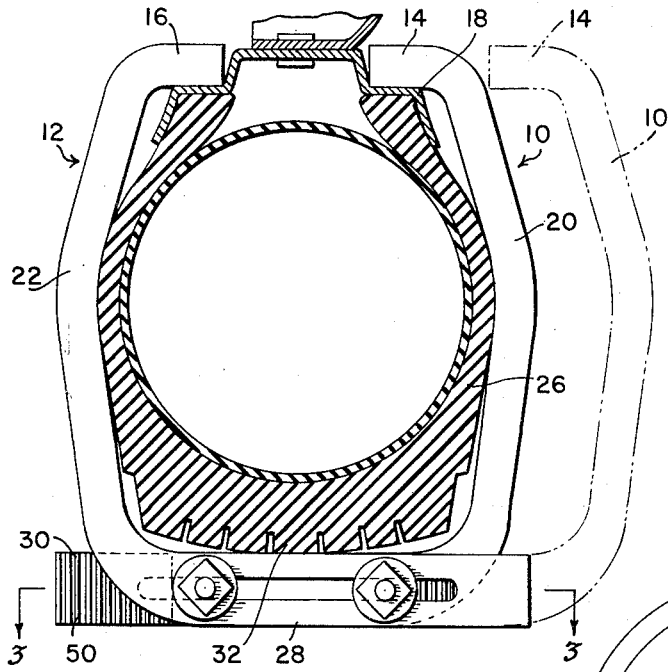
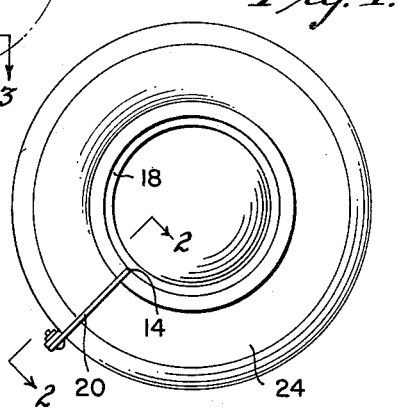
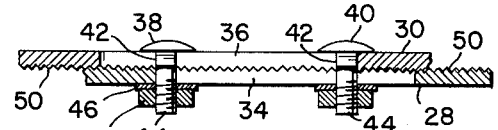
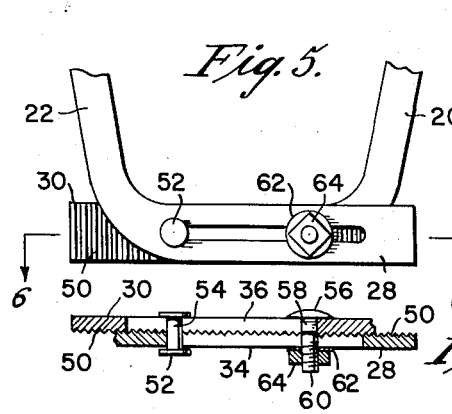
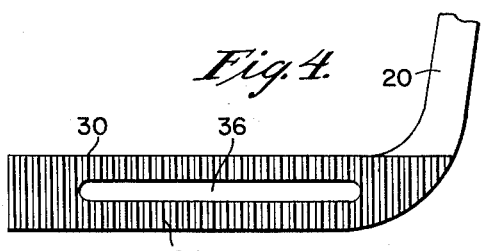
INVENTOR.
REUBEN L. YOUNG
BY
Caesar and Rivise
ATTORNEYS United States Patent Office 2,775,993
Patented Jan. 1, 1957

2,775,993

ADJUSTABLE ANTI-SKID DEVICE FOR PNEUMATIC TIRE

Reuben L. Young, Philadelphia, Pa.

Application October 12, 1954, Serial No. 461,819

1 Claim. (Cl. 152—228)

This application is a continuation in part of my co-pending application Serial No. 438,471, filed June 22, 1954.

This invention relates to a device for attachment to the rear wheels of a vehicle to increase the traction thereof and permit the vehicle to free itself from snow or ice for a time sufficient to allow the driver to reach a service station where tire chains can be installed.

The primary object of the invention is to provide an anti-skid device which is adjustable for different tire sizes and which can be readily mounted on the rear tires with a minimum of manipulation and effort.

A further object of the invention is to provide an adjustable anti-skid device which is comprised of a pair of complementary plates, means at one of the opposed ends for hooking them on to the rim of a tire, means to retain the other ends of the plates in overlapped adjusted positions, and means associated with the overlapped ends to securely retain them against accidental separation or relative movement.

And yet another object of the invention is to provide an adjustable anti-skid device of the character described which is relatively simple in design and construction, inexpensive and compact when demounted from the tire.

These and other objects of the invention will become more apparent as the following description proceeds in conjunction with the accompanying drawings, wherein:

Figure 1 is a side elevational view of the device shown mounted on a tire;

Figure 2 is an enlarged sectional view taken on the line 2—2 of Figure 1;

Figure 3 is a sectional view taken on the line 3—3 of Figure 2;

Figure 4 is a fragmentary side elevational view of the lower end of one of the complementary plates;

Figure 5 is a fragmentary side elevational view of a second form of the invention; and Figure 6 is a sectional view taken on the line 6—6 of Figure 5.

Specific reference will now be made to the drawings wherein similar reference characters are used for corresponding elements throughout.

Referring first to Figures 1–4, it will be noted that the device comprises a pair of complementary plates 10 and 12 which are preferably metallic and preferably relatively flat. In the assembled form, the plates are parallel to each other and in transverse opposition so that at their corresponding ends the plates include means, preferably hooks 14 and 16, which engage the metallic rim 18. The intermediate portions 20 and 22 of the plates are somewhat bowed and embrace the side walls 24 of the tire 26. The lower corresponding ends 28 and 30 of the plates are elongated and are adapted to extend transversely across and beneath the tread 32 of the tire.

The lower ends 28 and 30 of the plates overlap each other and are secured by a means permitting adjustment of the plates to conform to different tire sizes. The means in this form of the invention comprises a pair of matching elongated slots 34 and 36 lengthwise through the ends and a means to slidably and lockingly interconnect said overlapped ends. The latter means includes a pair of headed bolts 38 and 40 each having a shank including a squared portion 42 extending into the slot 36 and a threaded cylindrical portion 44 extending through and beyond the slot 34. A washer 46 and a nut 48 is received upon the threaded shank 44 of each of the bolts. Thus, when the nuts 48 are loose, the complementary plates can be spread apart to accommodate the desired tire size and the tightening of the nuts will retain the plates in the adjusted position.

An additional means is provided in association with the lower overlapped ends 28 and 30 of the complementary plates to further restrain them from accidentally opening or relative movement after the nuts 48 have been tightened. This means comprises longitudinally spaced, vertically extending teeth or serrations 50 throughout the entire length of the inner or meeting surfaces of the overlapped ends 28 and 30 of the complementary plates. The teeth in both plates may extend in the same direction and at a slight angle relative to the planes of said plates. As shown clearly in Figure 3, when the nuts 48 are tightened the teeth interlockingly engage to restrain relative longitudinal movement between the plates. These teeth also cooperate with the squared portions 42 of the bolts 38 and 40 to restrain relative rotary movement between the plates. It has further been found that because of the interlocking teeth, it is possible to tighten the nuts 48 by hand and the pressure of the nuts and washers thus produced is sufficient to force interlocking of the teeth and prevent relative movement between the plates. Thus the plates can be readily and easily assembled upon the rear wheels of a tire without the necessity of using wrenches or other tools.

The modified form of the device as shown in Figures 5 and 6 is identical in every respect with the device hereinabove described except that the means for locking the plates in an adjusted position is somewhat different. Thus, the overlapped ends 28 and 30 of the complementary plates are provided with elongated slots 34 and 36 and with cooperating interlocking teeth 50 at their meeting faces. A double headed rivet 52 is provided having a shank 54 which loosely extends through the slots 34 and 36, the distance between the heads of the rivet being slightly larger than the combined thicknesses of the lower ends 28 and 30 of the complementary plates to allow the plates to slide freely in overlapped relationship.

A headed bolt 56 is provided having a shank including a squared portion 58 extending into the slot 36 and a threaded cylindrical portion 60 extending into and through the slot 34. A washer 62 and a nut 64 are received on the threaded portion 60 of the headed bolt 56. Thus, in this form of the invention the rivet serves to keep the complementary plates in assembly. When the desired adjusted position is obtained, the nut 64 is tightened on the bolt 56, to lock the plates securely in the adjusted position, the interengaging teeth 50 serving to restrain any relative longitudinal movement between the plates and cooperating with the squared portion 58 of the shank of the bolt to restrain relative rotary movement between the plates.

The mounting and demounting of both forms of the invention upon the rear tires of a vehicle in front of their points of contact with the ice or snow will be apparent from the above description of the devices.

While preferred embodiments of the invention have been shown and described herein, skilled artisans may make minor variations without departing from the spirit of the invention and the scope of the appended claim.

I claim:

An adjustable anti-skid device for a pneumatic tire mounted on a wheel rim comprising a pair of integral complementary plates each including a hook end adapted to engage the rim, an intermediate portion adapted to embrace the side wall of a tire and an elongated portion opposite the hook end and adapted to extend transversely across and beneath the tire tread, said elongated portions overlapping each other, matching elongated slots in said elongated portions terminating adjacent the ends thereof, spaced cooperating interlocking teeth in the abutting faces of said elongated portions, headed bolts having shanks generally perpendicular to said overlapped elongated portions and extending through said matching slots and closure nuts on said shanks, whereby said complementary plates may be adjusted laterally to accommodate different tire sizes.

References Cited in the file of this patent

UNITED STATES PATENTS

| | | |
|---|---|---|
| 1,499,036 | Smith | June 24, 1924 |
| 1,619,170 | Vosburgh | Mar. 1, 1927 |
| 2,584,625 | Schwab | Feb. 5, 1952 |
| 2,596,517 | Allen | May 13, 1952 |